Patented Jan. 9, 1940

2,186,906

UNITED STATES PATENT OFFICE 2,186,906

BIOCHEMICAL HYDROGENATION OF PHENANTHRENES

Luigi Mamoli, Berlin-Lichterfelde, Germany, assignor to Schering Corporation, Bloomfield, N. J., a corporation of New Jersey No Drawing. Application February 25, 1938, Serial No. 192,648. In Germany February 27, 1937

8 Claims. (Cl. 195—51)

This invention relates to the hydrogenation of compounds of the cyclopentanopolyhydrophenanthrene series containing keto groups to compounds of the cyclopentanopolyhydrophenanthrene series containing hydroxyl groups and more particularly to a method which consists in that said hydrogenation is carried out biochemically.

The biochemical hydrogenation is carried out according to methods which in themselves are known, for instance, by introducing the starting material to be hydrogenated gradually or all at once into a fermentation substratum wherein a reducing fermentation is taking place. As agents which bring about the reducing fermentation advantageously microorganisms or enzymes obtained therefrom are employed; especially suitable is, for instance, the application of top yeast.

With the said biochemical hydrogenation method it is possible according to the starting material used to produce physiologically valuable substances in a relatively simple manner and with high yield which can be obtained by purely chemical methods usually only with difficulty or with low yield.

Thus, for instance, androsterone can easily be converted into cis-androstandiole by biochemical hydrogenation, whereas dehydroandrosterone yields androstandiole when it is biochemically hydrogenated.

According to the present invention the method of the biochemical hydrogenation is very suitable in case that polyoxo-compounds of the cyclopentanopolyhydrophenanthrene series are used as starting materials, particularly those wherein a carbon to carbon double bond is conjugated to one of the keto groups, for instance the $\Delta_{1,2}$-androstendione-3,17 and the $\Delta_{4,5}$-androstendione-3,17.

Especially the last mentioned compound, the $\Delta_{4,5}$-androstendione, yields a very valuable product, when it is biochemically hydrogenated, namely the $\Delta_{4,5}$-androstenole-17-one-3, the so-called testosterone; in this case surprisingly only the keto group at the carbon atom 17 is hydrogenated, whereas the keto group at the carbon atom 3 as well as the double bond between the carbon atoms 4 and 5 remain unattacked.

The applicability of the process according to the present invention to keto cyclopentano polyhydro phenanthrene compounds generally will be evident from the following examples which are given by way of illustration.

Example 1

Into a mixture which consists of 50 grams of saccharose, 25 grams of yeast cake and 300 grams of water and which is in the state of complete fermentation, is introduced drop by drop with stirring a solution of 150 mg. of $\Delta_{4,5}$-androstendione-3,17 in 20 ccs. of ethyl alcohol. The fermentation is continued for 4 days. Then the alcohol is distilled off and the remaining part extracted with ether. The residue obtained on evaporating the ether is distilled in a high vacuum at 0.001 mm. Hg. and 130–170 C.° (air bath) and the distillate is then recrystallized from diluted acetone. A crystallized substance is obtained in very good yield which melts at 150–151 C.° (uncorr.) and is identical with testosterone.

Example 2

A mixture of 50 grams of invert sugar, 25 grams of top yeast (Mailand flocky ferments) and 300 ccs. of water, in a state of complete fermentation, is treated drop by drop with a solution of 180 mg. of dehydroandrosterone in 20 ccs. of alcohol.

The whole is kept fermenting 42 hours at about 20 C.° whereupon a further 10 grams of invert sugar, 10 grams of top yeast and 100 ccs. of water are added. When the fermentation is essentially completed and the solution reduces Fehling's reagents only weakly, usually after about 90 hours, the solution is decanted from the yeast sediment. Both portions are several times extracted with ether and the combined extracts evaporated. The oily residue obtained is fractionally distilled in a high vacuum (0.001 Hg.). The fraction distilling between 140–180 C°. (air bath) is washed with petrol ether. The solid residue obtained thereby is recrystallized several times from diluted acetone. 32 mg. of a crystallized substance of the melting point 178–179 C.° are obtained which is identical with $\Delta_{5,6}$-androstendiole.

Example 3

To a mixture which consists of 40 grams of sugar, 20 grams of yeast and 300 ccs. of water and is in a state of complete fermentation, while frequently stirring, a solution of 200 mg. of $\Delta_{5,6}$-androstendiole-3,17 in 20 ccs. of alcohol is added; the fermentation is continued at room temperature for three days; thereupon the solution is de-canted from the yeast sediment. Both portions are extracted with ether. The ethereal extracts are combined and washed with n. sodium hydroxide solution, diluted hydrochloric acid and water. The ethereal solution is evaporated and the residue recrystallized from acetone and petrol ether and subsequently from acetone and diluted alcohol. A substance of the melting point 163–164 C.° and the optical rotation $$[\alpha]_D^{25} = +4.3°$$

is obtained which is identical with iso androstandiole.

The mother liquor of the first crystallization from acetone and petrol ether yields on standing for several days a small amount of a substance which after recrystallizing from diluted acetone proves to be identical with Δ4,5-androstenol-17-one-3.

*Example 4*

To a mixture consisting of 40 grams of invert sugar, 20 grams top yeast and 300 ccs. of water and being in a state of vigorous fermentation, a solution of 200 mg. of androstandione-3,17 in 20 ccs. of alcohol with frequent stirring is added. The fermentation mixture is kept for three days at about 22 C.°; then the whole is extracted with ether and the ethereal solution successively washed with n. sodium hydroxide solution, diluted hydrochloric acid and water. The ethereal solution is evaporated and the residue fractionally distilled in a high vacuum (0.001 mm. Hg.). The portion distilling between 140–170 C.° (air bath) is recrystallized from acetone and diluted alcohol; a crystalline substance of the melting point 163–164 C.° is obtained which is identical with iso androstandiole.

*Example 5*

To a fermentation mixture consisting of 150 grams of cane sugar, 20 grams brewers' yeast, 40 grams of sodium sulfite and 1500 ccs. of water, an aqueous solution of 10 grams of the sodium salt of 3,17-diketocholaic acid is added. The mixture is kept standing for two months at 35 C.; during this time the cane sugar contents are renewed three times, thereupon the reduction mixture is acidified with diluted hydrochloric acid and extracted with ether. The ethereal solution is evaporated to dryness and the residue recrystallized from diluted alcohol, thereby about 6 grams of 3-hydroxy-12-keto-cholaic acid of the melting point 165 C.° are obtained.

*Example 6*

A solution of 2 grams of cholestanone in 100 ccs. of alcohol is added to a mixture which contains 150 ccs. of cane sugar, 20 grams of brewers' yeast, 30 grams of sodium sulfite and 1500 ccs. of water and is in the state of vigorous fermentation. The fermentation mixture is kept for two months at 35 C.° during which time the contents of cane sugar are renewed three times. Thereupon the reaction mixture is extracted with ether and the ethereal solution washed with n. sodium hydroxide solution, with diluted hydrochloric acid and water. The residue produced on evaporating the ethereal solution is recrystallized from alcohol; about 1.3 grams of cholestanole of the melting point 141–142 C.° are obtained.

Instead of the starting materials mentioned above also other compounds containing keto groups can be applied in so far as they possess the cyclopentanopolyhydrophenanthrene ring system.

Furthermore the modes of procedure and the reacting conditions in performing the biochemical hydrogenation can be varied in manifold ways known to the expert. Thus, for instance, in order to promote the fermentation so-called activators may be added to the substratum, e. g. salts of the type of the primary or secondary sodium phosphate, calcium carbonate or nitrogen containing compounds which cause the fermentation organisms to grow more rapidly; in some cases the addition of sulfites, such as sodium sulfite or the like, may be advisable.

What I claim is:

1. Process for the conversion of a keto-compound of the cyclopentano-10,13 dimethyl-polyhydro-phenanthrene series into a corresponding hydroxyl compound of the same series which comprises subjecting such keto compound to the action of a reducing yeast-containing fermenting solution.

2. Process for the conversion of a keto-compound of the cyclopentano-10,13-dimethyl-polyhydro-phenanthrene series into a corresponding hydroxyl compound of the same series which comprises subjecting such keto compound to the action of a reducing fermenting sugar substratum containing top yeast.

3. Process for the conversion of a keto-compound of the cyclopentano-10,13-dimethyl-polyhydro-phenanthrene series into a corresponding hydroxyl compound of the same series which comprises subjecting such keto compound to the action of a reducing yeast-containing fermenting solution containing also an activator of the group consisting of primary and secondary sodium phosphates, calcium carbonate, sulfites, and nitrogen-containing compounds which cause the fermentation organisms to grow more rapidly.

4. Process for the conversion of a keto-compound of the cyclopentano-10,13-dimethyl-polyhydro-phenanthrene series into a corresponding hydroxyl compound of the same series which comprises subjecting such keto-compound to the action of a reducing yeast-containing fermenting solution which contains also sodium sulfite.

5. Process for the conversion of a keto-compound of the androstane series into a corresponding hydroxyl compound of the same series, which comprises subjecting such keto-compound to the action of a reducing yeast-containing fermenting solution.

6. Process for the conversion of a poly-keto-compound of the androstane series having a carbon-to-carbon double bond conjugated to one of the keto groups, into a corresponding hydroxyl compound, which comprises subjecting such poly-keto-compound to the action of a reducing yeast-containing fermenting solution.

7. Process for the conversion of Δ4,5-androstendione-3,17 into testosterone which comprises subjecting the androstendione to the action of a reducing yeast-containing fermenting solution.

8. Process as set forth in claim 7 including the step of extracting the formed testosterone with a water-immiscible organic solvent.

LUIGI MAMOLI.